(12) United States Patent
Neog et al.

(10) Patent No.: US 11,979,186 B2
(45) Date of Patent: May 7, 2024

(54) COMPUTATION OF OPTIMUM FIBER INPUT POWER

(71) Applicant: Infinera Corp., San Jose, CA (US)

(72) Inventors: Ankur Neog, Bangalore (IN); Zhong Pan, Naperville, IL (US); Baranidhar Ramanathan, Karnataka (IN)

(73) Assignee: Infinera Corporation, San Jose, CA (US)

( * ) Notice: Subject to any disclaimer, the term of this patent is extended or adjusted under 35 U.S.C. 154(b) by 57 days.

(21) Appl. No.: 17/929,170

(22) Filed: Sep. 1, 2022

(65) Prior Publication Data
US 2023/0079797 A1    Mar. 16, 2023

Related U.S. Application Data

(60) Provisional application No. 63/243,923, filed on Sep. 14, 2021.

(51) Int. Cl.
*H04B 10/079* (2013.01)
*G06N 3/082* (2023.01)

(52) U.S. Cl.
CPC ....... *H04B 10/07953* (2013.01); *G06N 3/082* (2013.01)

(58) Field of Classification Search
CPC .......................... H04B 10/07953; G06N 3/082
See application file for complete search history.

(56) References Cited

U.S. PATENT DOCUMENTS

| 2018/0343078 A1* | 11/2018 | Roberts | H04B 10/58 |
| 2019/0149229 A1* | 5/2019 | Yilmaz | H04L 41/40 |
| | | | 398/10 |

OTHER PUBLICATIONS

Matteo Lonardi, "Optical Nonlinearity Monitoring and Launch Power Optimization by Artificial Neural Networks", May 2020, Journal of Lightwave Technology, All pages (Year: 2020).*
AS Kashi, "Fiber Nonlinear Noise-to-Signal Ratio Monitoring Using Artificial Neural Networks", 2017, 2017 European Conference on Optical Communication, All Pages (Year: 2017).*

* cited by examiner

*Primary Examiner* — Pranesh K Barua
(74) *Attorney, Agent, or Firm* — David L. Soltz

(57) ABSTRACT

Disclosed herein are methods and systems for computing a launch power for an optical node by collecting data for an optical network segment and inputting the collected data and first power spectral density values into a machine learning model which are used to compute a first non-linear interference value. A first generalized-optical signal-to-noise ratio value is computed using the computed first non-linear interference value and amplified spontaneous emission values. At least one second generalized-optical signal-to-noise ratio value is computed using at least one second non-linear interference value, computed using at least one second power spectral density values, and the amplified spontaneous emission values. A highest generalized-optical signal-to-noise ratio value is determined by comparing the first generalized-optical signal-to-noise ratio value and the at least one second generalized-optical signal-to-noise ratio value. A launch power is computed using the power spectral density values associated with the highest generalized-optical signal-to-noise ratio.

17 Claims, 6 Drawing Sheets

COMPUTATION OF OPTIMUM FIBER INPUT POWER

CROSS REFERENCE TO RELATED APPLICATION

This application claims the benefit of U.S. Provisional Patent Application No. 63/243,923, which was filed on Sep. 14, 2021, the contents of which are incorporated herein by reference in their entirety.

BACKGROUND

In an optical communication system, a reconfigurable optical add-drop multiplexer (ROADM) is a form of optical add-drop multiplexer capable of remotely switching traffic from a wavelength-division multiplexing (WDM) system at the wavelength layer. This remote switching is achieved through the use of a wavelength selective switching module present in the ROADM There is a current trend in networking towards autonomous, data-driven systems, with little-to-no dependency on external inputs such as offline planning tools. Autonomous power settings today can be achieved with the use of predefined static tables. More accurate methodologies are being explored, for example by extending the path computation engine of a software defined network (SDN) Optical Controller with an interface to a physical simulation environment (e.g., openDaylight TransportPCE or interfacing TIP PSE GNPy).

For both signal performance assessment and signal launch power optimization, an optical performance metric is needed, such as the well-established generalized signal-to-noise-ratio (GSNR). GSNR is a measure of the total noise contributions due to amplifier noise (amplified spontaneous emission (ASE)) and fiber nonlinearities (expressed as Non-Linear Interference noise (NLI)). Both noise contributions depend on the actual properties of the physical transmission system (e.g., fiber and amplifier characteristics) and of the transmitted signal spectrum (channel modulation type, symbol rate, channel distance) in the field. Assuming that the required information is present, calculation of the ASE component is rather straightforward. On the contrary, there is not a generally valid closed-form analytical formula to calculate the nonlinear component and traditional methods such as split step Fourier method (SSFM) or Gaussian noise (GN) model are computationally intensive.

The methods and systems disclosed herein solve these problems by automatically computing an NLI value that takes into account several independent variables. The computed NLI value may be used in computing a launch power of an optical node and for performance assessment of routed signals in an optical network with high accuracy and without the need for manual intervention by an operator.

SUMMARY

In one aspect, in accordance with some implementations, the specification describes methods and systems including a method comprising: collecting data for an optical network segment, the data including fiber parameters, spectral parameters, and signal parameters; inputting the collected data for the optical network segment and first power spectral density values in a machine learning model; computing, with the machine learning model, a first non-linear interference value of the optical network segment; collecting amplified spontaneous emission values for the optical network segment; computing a first generalized-optical signal-to-noise ratio value using the computed first non-linear interference value and the amplified spontaneous emission values for the optical network segment; iteratively inputting the collected data and at least one second power spectral density values into the machine learning model to compute at least one second non-linear interference value of the optical network segment; computing at least one second generalized-optical signal-to-noise ratio value using the at least one second non-linear interference value and the amplified spontaneous emission values for the optical network segment; determining a highest generalized-optical signal-to-noise ratio value for the optical network segment by comparing the first generalized-optical signal-to-noise ratio value and the at least one second generalized-optical signal-to-noise ratio value; computing a launch power for an optical node of the optical network segment using the power spectral density values associated with the highest generalized-optical signal-to-noise ratio value for the optical network segment; and applying the launch power to the optical node of the optical network segment.

The exemplary method, wherein the machine learning model is generated using machine learning techniques comprising: training a neural network by inputting a plurality of training datasets into the neural network, each of the plurality of training datasets having fiber parameters, spectral parameters, signal parameters, and power spectral density values of a training optical network segment as inputs and a non-linear interference value as an output, wherein the neural network successively analyzes the plurality of training datasets and adjusts weights of connections between nodes in layers of the neural network to correct outputs until a corrected training output is accurate to within a margin of error when compared to the non-linear interference value associated with the training dataset that was input last, the neural network having the corrected training output being a trained neural network.

The exemplary method, wherein the machine learning model is generated using machine learning techniques further comprising: testing the trained neural network using at least one testing dataset, the at least one testing dataset comprising fiber parameters, spectral parameters, signal parameters, and power spectral density values of a testing optical network segment as testing input data and a testing non-linear interference value as testing output data, the testing comprising inputting the testing input data of the at least one testing dataset into the trained neural network and comparing a corrected testing output of the trained neural network to the testing output data of the at least one testing dataset.

In one aspect of the present disclosure, a system, comprising: an optical network having at least one optical network segment; and an optical node having at least one multiplexer, at least one de-multiplexer, a control channel, and a controller, the controller having a first processor and a first non-transitory computer readable memory storing first instructions and a machine learning model; wherein the first instructions, when executed by the first processor, cause the controller to: collect data for the at least one optical network segment, the data including amplified spontaneous emission values, fiber parameters, spectral parameters, and signal parameters; input the collected fiber parameters, spectral parameters, and signal parameters and first power spectral density values into the machine learning model; compute a first non-linear interference value of the at least one optical network segment using the machine learning model; compute a first generalized-optical signal-to-noise ratio value using the computed first non-linear interference value and the amplified spontaneous emission values; input the collected fiber parameters, spectral parameters, and signal parameters and at least one second power spectral density values into the machine learning model to compute at least one second non-linear interference value of the at least one optical network segment; compute at least one second generalized-optical signal-to-noise ratio value using the at least one second non-linear interference value and the amplified spontaneous emission values for the at least one optical network segment; determine a highest generalized-optical signal-to-noise ratio value for the at least one optical network segment by comparing the first generalized-optical signal-to-noise ratio value and the at least one second generalized-optical signal-to-noise ratio value; compute a launch power for the optical node using the power spectral density values associated with the highest generalized-optical signal-to-noise ratio value for the at least one optical network segment; and apply the launch power to the optical node.

The exemplary system, further comprising a network administration device having a second processor and a second non-transitory computer readable memory storing second instructions that when executed cause the second processor to generate the machine learning model using machine learning techniques and deploy the machine learning model to the controller of the optical node, wherein generating the machine learning model using machine learning techniques comprises: training a neural network by inputting a plurality of training datasets into the neural network, each of the plurality of training datasets having fiber parameters, spectral parameters, signal parameters, and power spectral density values of a training optical network segment as inputs and a non-linear interference value as an output, wherein the neural network successively analyzes the plurality of training datasets and adjusts weights of connections between nodes in layers of the neural network to correct outputs until a corrected training output is accurate to within a margin of error when compared to the non-linear interference value associated with the training dataset that was input last, the neural network having the corrected training output being a trained neural network.

The exemplary system, wherein generating the machine learning model using machine learning techniques further comprises: testing the trained neural network using at least one testing dataset, the at least one testing dataset comprising fiber parameters, spectral parameters, signal parameters, and power spectral density values of a testing optical network segment as testing input data and a testing non-linear interference value as testing output data, the testing comprising inputting the testing input data of the at least one testing dataset into the trained neural network and comparing a corrected testing output of the trained neural network to the testing output data of the at least one testing dataset.

Implementations of the above techniques include methods, apparatus, systems, and computer program products. One such computer program product is suitably embodied in a non-transitory machine-readable medium that stores instructions executable by one or more processors. The instructions are configured to cause the one or more processors to perform the above-described actions.

The details of one or more implementations of the subject matter of this specification are set forth in the accompanying drawings and the description below. Other aspects, features and advantages will become apparent from the description, the drawings, and the claims.

BRIEF DESCRIPTION OF DRAWINGS

The accompanying drawings, which are incorporated in and constitute a part of this specification, illustrate one or more implementations described herein and, together with the description, explain these implementations. The drawings are not intended to be drawn to scale, and certain features and certain views of the figures may be shown exaggerated, to scale or in schematic in the interest of clarity and conciseness. Not every component may be labeled in every drawing. Like reference numerals in the figures may represent and refer to the same or similar element or function. In the drawings.

DETAILED DESCRIPTION

Figure 1:
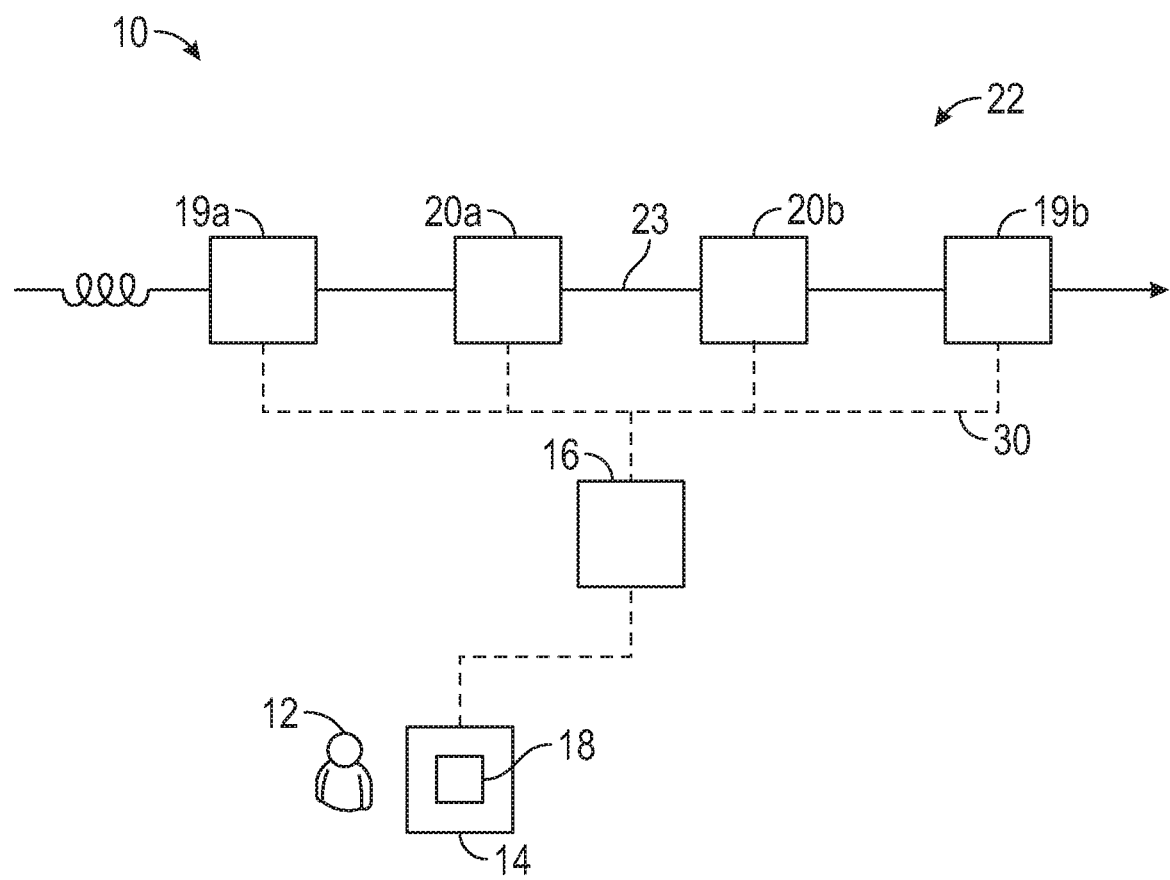
FIG. 1 is a diagrammatic view of hardware forming an exemplary optical network having a system for automatically computing an NLI value that may be used to compute a launch power for an optical node constructed in accordance with one embodiment of the present disclosure.

The following detailed description of example embodiments refers to the accompanying drawings. The same reference numbers in different drawings may identify the same or similar elements.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the inventive concept. This description should be read to include one or more and the singular also includes the plural unless it is obvious that it is meant otherwise.

Further, use of the term "plurality" is meant to convey "more than one" unless expressly stated to the contrary.

As used herein, qualifiers like "about," "approximately," and combinations and variations thereof, are intended to include not only the exact amount or value that they qualify, but also some slight deviations therefrom, which may be due to manufacturing tolerances, measurement error, wear and tear, stresses exerted on various parts, and combinations thereof, for example.

As used herein, the term "substantially" means that the subsequently described parameter, event, or circumstance completely occurs or that the subsequently described parameter, event, or circumstance occurs to a great extent or degree. For example, the term "substantially" means that the subsequently described parameter, event, or circumstance occurs at least 90% of the time, or at least 91%, or at least 92%, or at least 93%, or at least 94%, or at least 95%, or at least 96%, or at least 97%, or at least 98%, or at least 99%, of the time, or means that the dimension or measurement is within at least 90%, or at least 91%, or at least 92%, or at least 93%, or at least 94%, or at least 95%, or at least 96%, or at least 97%, or at least 98%, or at least 99%, of the referenced dimension or measurement.

The use of the term "at least one" or "one or more" will be understood to include one as well as any quantity more than one. In addition, the use of the phrase "at least one of X, V, and Z" will be understood to include X alone, V alone, and Z alone, as well as any combination of X, V, and Z.

The use of ordinal number terminology (i.e., "first", "second", "third", "fourth", etc.) is solely for the purpose of differentiating between two or more items and, unless explicitly stated otherwise, is not meant to imply any sequence or order or importance to one item over another or any order of addition.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Circuitry, as used herein, may be analog and/or digital components, or one or more suitably programmed processors (e.g., microprocessors) and associated hardware and software, or hardwired logic. Also, "components" may perform one or more functions. The term "component" may include hardware, such as a processor (e.g., microprocessor), a combination of hardware and software, and/or the like. Software may include one or more computer executable instructions that when executed by one or more components cause the component to perform a specified function. It should be understood that the algorithms described herein may be stored on one or more non-transitory memory. Exemplary non-transitory memory may include random access memory, read only memory, flash memory, and/or the like. Such non-transitory memory may be electrically based, optically based, and/or the like.

As used herein, the terms "network—based," "cloud-based," and any variations thereof, are intended to include the provision of configurable computational resources on demand via interfacing with a computer and/or computer network, with software and/or data at least partially located on a computer and/or computer network.

As used herein, a "route" and/or an "optical route" may correspond to an optical path and/or an optical light path. For example, an optical route may specify a path along which light is carried between two or more network entities.

As used herein, an optical link may be an optical fiber, an optical channel, an optical super-channel, a super-channel group, an optical carrier group, a set of spectral slices, an optical control channel (e.g., sometimes referred to herein as an optical supervisory channel, or an "OSC"), an optical data channel (e.g., sometimes referred to herein as "BAND"), and/or any other optical signal transmission link.

In some implementations, an optical link may be an optical super-channel. A super-channel may include multiple channels multiplexed together using wavelength-division multiplexing in order to increase transmission capacity. Various quantities of channels may be combined into super-channels using various modulation formats to create different super-channel types having different characteristics. Additionally, or alternatively, an optical link may be a super-channel group. A super-channel group may include multiple super-channels multiplexed together using wavelength-division multiplexing in order to increase transmission capacity.

Additionally, or alternatively, an optical link may be a set of spectral slices. A spectral slice (a "slice") may represent a spectrum of a particular size in a frequency band (e.g., 12.5 gigahertz ("GHz"), 6.25 GHz, etc.). For example, a 4.8 terahertz ("THz") frequency band may include 384 spectral slices, where each spectral slice may represent 12.5 GHz of the 4.8 THz spectrum. A super-channel may include a different quantity of spectral slices depending on the super-channel type.

As used herein, a transmission line segment is the portion of a transmission line from a first node (e.g., ROADM) transmitting a transmission signal to a second node (e.g., ROADM) receiving the transmission signal. The transmission line segment may include one or more optical in-line amplifier situated between the first node and the second node.

Amplified spontaneous emission (ASE) is light produced by spontaneous emission that has been optically amplified by the process of stimulated emission in a gain medium. ASE is light that is incoherent and causes perturbations on the optical link. Every optical amplifier, e.g., EDFAs and Raman amplifiers, emit ASE. If an amplified spontaneous emission power level is too high relative to the transmission signal power level, the transmission signal in the fiber optic cable will be unreadable due to a low signal to noise ratio.

Transmission launch power may include a spectral power, which may be described in decibel-milliwatts (dBm or dBmW), of a transmission signal after each transmitter or amplifier.

As used herein, the C-Band is a band of light having a wavelength between 1528.6 nm and 1566.9 nm. The L-Band is a band of light having a wavelength between 1569.2 nm and 1609.6 nm. Because the wavelength of the C-Band is smaller than the wavelength of the L-Band, the wavelength of the C-Band may be described as a short, or a shorter, wavelength relative to the L-Band. Similarly, because the wavelength of the L-Band is larger than the wavelength of the C-Band, the wavelength of the L-Band may be described as a long, or a longer, wavelength relative to the C-Band.

As used herein, a reconfigurable add-drop multiplexer (ROADM) node refers to an all-optical subsystem that enables remote configuration of wavelengths at any ROADM node. A ROADM is software-provisionable so that a network operator can choose whether a wavelength is added, dropped, or passed through the ROADM node. The technologies used within the ROADM node include wavelength blocking, planar light wave circuit (PLC), and wavelength selective switching (WSS)—though the WSS has become the dominant technology. A ROADM system is a metro/regional wavelength division multiplexing (WDM) or long-haul dense wavelength division multiplexing (DWDM) system that includes a ROADM node. ROADMs are often talked about in terms of degrees of switching, ranging from a minimum of two degrees to as many as eight degrees, and occasionally more than eight degrees. A "degree" is another term for a switching direction and is generally associated with a transmission fiber pair. A two-degree ROADM node switches in two directions, typically called East and West. A four-degree ROADM node switches in four directions, typically called North, South, East, and West. In a WSS-based ROADM network, each degree requires an additional WSS switching element. So, as the directions switched at a ROADM node increase, the ROADM node's cost increases.

As used herein, a labeled dataset refers to a set of data that has been tagged with one or more labels identifying certain properties or characteristics associated with each data point in the labeled dataset. Each data point in the labeled dataset will be referred to as labeled data which is used in data training and testing exercises involving a neural network as will be described in detail herein.

As used herein, carrier spacing scaling factor (CSSF) refers to a ratio between channel spacing and a symbol rate of an optical channel. For example, if the optical channel spacing is 100 GHz and the symbol rate is 84 Gbaud, the CSSF=100/84.

FIG. 1 is a diagrammatic view of hardware forming an exemplary system 10 for automatically computing an NLI value that may be used to compute a launch power for an optical node, the launch power configured to launch a signal from a ROADM or optical amplifier at a power that maintains a desired optical signal to noise ratio (OSNR) constructed in accordance with one embodiment of the present disclosure. A user 12 may interact with the system 10 using a user device 14 that may be used to request, from a network administration device 16, a graphical user interface 18 (hereinafter "GUI 18") configured to accept input from the user 12 that may be transmitted to one or more optical node 19 such as optical node 19a and/or optical node 19b of an optical network 22.

The network administration device 16 may be connected to the optical network 22 and the user device 14 via a network 30. In some embodiments, the network 30 may be the Internet and/or other network. For example, if the network 30 is the Internet, the GUI 18 of the system 10 may be delivered through a series of web pages or private internal web pages of a company or corporation, which may be written in hypertext markup language. It should be noted that the GUI 18 of the system 10 may be another type of interface including, but not limited to, a Windows-based application, a tablet-based application, a mobile web interface, an application running on a mobile device, and/or the like.

The network 30 may be almost any type of network. For example, in some embodiments, the network 30 may be a version of an Internet network (e.g., exist in a TCP/IP-based network). It is conceivable that in the near future, embodiments within the present disclosure may use more advanced networking technologies.

Optical network 22 may include any type of network that uses light as a transmission medium. For example, optical network 22 may include a wavelength division multiplexed optical communication system, a fiber-optic based network, an optical transport network, a laser diode network, an infrared network, and/or a combination of these or other types of optical networks. The optical network may be provided with one or more optical amplifier 20 such as optical amplifier 20a and optical amplifier 20b.

The one or more optical nodes 19 may be a reconfigurable add-drop multiplexer (ROADM) node. An optical network segment 23 connects optical nodes 19 and optical amplifiers 20 in the optical network 22.

The number of devices and/or networks illustrated in FIG. 1 is provided for explanatory purposes. In practice, there may be additional devices and/or networks, fewer devices and/or networks, different devices and/or networks, or differently arranged devices and/or networks than are shown in FIG. 1. Furthermore, two or more of the devices illustrated in FIG. 1 may be implemented within a single device, or a single device illustrated in FIG. 1 may be implemented as multiple, distributed devices. Additionally, or alternatively, one or more of the devices of system 10 may perform one or more functions described as being performed by another one or more of the devices of the system 10. Devices of the system 10 may interconnect via wired connections, wireless connections, or a combination of wired and wireless connections.

Figure 2:
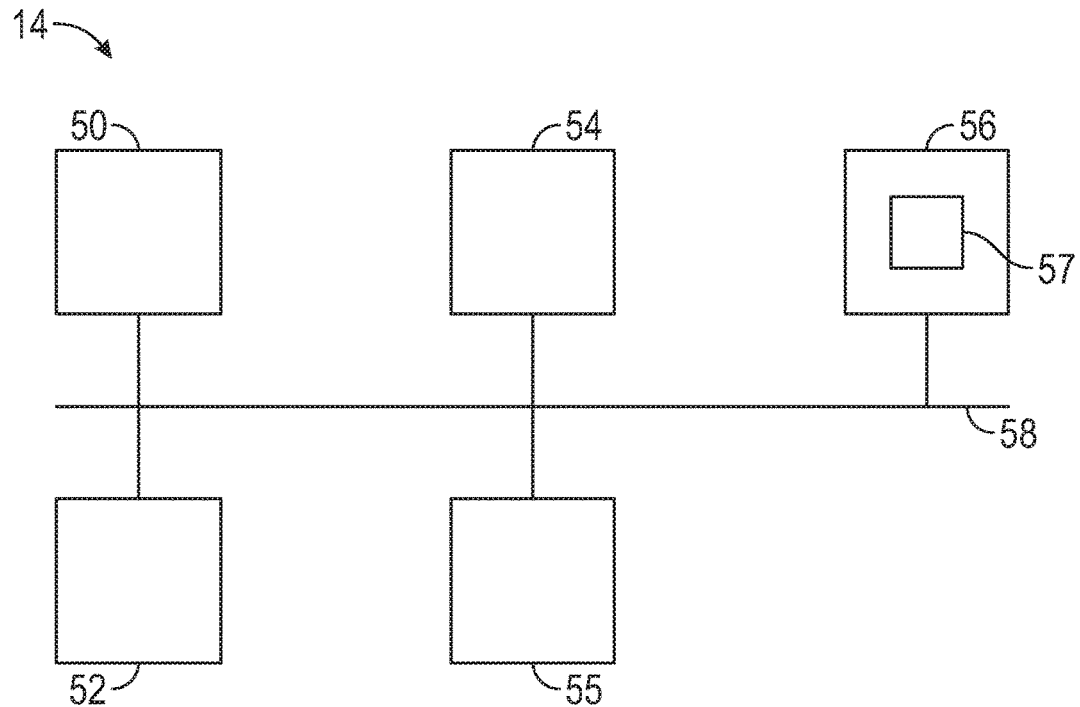
FIG. 2 is a diagrammatic view of an exemplary user device for use in the system for automatically computing an NLI value that may be used to compute a launch power for an optical node illustrated in FIG. 1.

As shown in FIG. 2, the one or more user devices 14 of the system 10 may include, but are not limited to implementation as a personal computer, a cellular telephone, a smart phone, a network-capable television set, a tablet, a laptop computer, a desktop computer, a network-capable handheld device, a server, a digital video recorder, a wearable network-capable device, and/or the like.

In some embodiments, the user device 14 may include one or more input devices 50 (hereinafter "input device 50"), one or more output devices 52 (hereinafter "output device 52"), one or more processors 54 (hereinafter "processor 54"), one or more communication devices 55 (hereinafter "communication device 55") capable of interfacing with the network 30, one or more non-transitory memory 56 (hereinafter "memory 56") storing processor executable code and/or software application(s), for example including, a web browser capable of accessing a website and/or communicating information and/or data over a wireless or wired network (e.g., network 30), and/or the like. The input device 50, output device 52, processor 54, communication device 55, and memory 56 may be connected via a path 58 such as a data bus that permits communication among the components of user device 14.

The memory 56 may store an application 57 that, when executed by the processor 54 causes the user device 14 to display the GUI 18. In some embodiments, the application 57 is programmed to cause the processor 54 to provide the GUI 18 that allows the user 12 to interact with both historical and real-time information gathered from the network elements 20 as will be described further herein. The input device 50 may be capable of receiving information input from the user 12 and/or processor 54, and transmitting such information to other components of the user device 14 and/or the network 30. The input device 50 may include, but are not limited to, implementation as a keyboard, touchscreen, mouse, trackball, microphone, fingerprint reader, infrared port, slide-out keyboard, flip-out keyboard, cell phone, PDA, remote control, fax machine, wearable communication device, network interface, combinations thereof, and/or the like, for example.

The output device 52 may be capable of outputting information in a form perceivable by the user 12 and/or processor 54. For example, implementations of the output device 52 may include, but are not limited to, a computer monitor, a screen, a touchscreen, a speaker, a web site, a television set, a smart phone, a PDA, a cell phone, a fax machine, a printer, a laptop computer, combinations thereof, and the like, for example. It is to be understood that in some exemplary embodiments, the input device 50 and the output device 52 may be implemented as a single device, such as, for example, a touchscreen of a computer, a tablet, or a smartphone. It is to be further understood that as used herein the term user 12 is not limited to a human being, and may comprise, a computer, a server, a website, a processor, a network interface, a human, a user terminal, a virtual computer, combinations thereof, and/or the like, for example.

The network administration device 16 may be capable of interfacing and/or communicating with the user device 14 via the network 30. For example, the network administration device 16 may be configured to interface by exchanging signals (e.g., analog, digital, optical, and/or the like) via one or more ports (e.g., physical ports or virtual ports) using a network protocol, for example. Additionally, each network administration device 16 may be configured to interface and/or communicate with other network administration device 16 directly and/or via the network 30, such as by exchanging signals (e.g., analog, digital, optical, and/or the like) via one or more ports.

The network 30 may permit bi-directional communication of information and/or data between the network administration device 16, the user device 14, and/or the optical amplifiers 20. The network 30 may interface with the network administration device 16, the user device 14, and/or the optical amplifiers 20 in a variety of ways. For example, in some embodiments, the network 30 may interface by optical and/or electronic interfaces, and/or may use a plurality of network topographies and/or protocols including, but not limited to, Ethernet, TCP/IP, circuit switched path, combinations thereof, and/or the like. For example, in some embodiments, the network 30 may be implemented as the World Wide Web (or Internet), a local area network (LAN), a wide area network (WAN), a metropolitan network, a 4G network, a 5G network, a satellite network, a radio network, an optical network, a cable network, a public switch telephone network, an Ethernet network, combinations thereof, and the like, for example. Additionally, the network 30 may use a variety of network protocols to permit bi-directional interface and/or communication of data and/or information between the network administration device 16, the user device 14 and/or the optical amplifiers 20.

Figure 3:
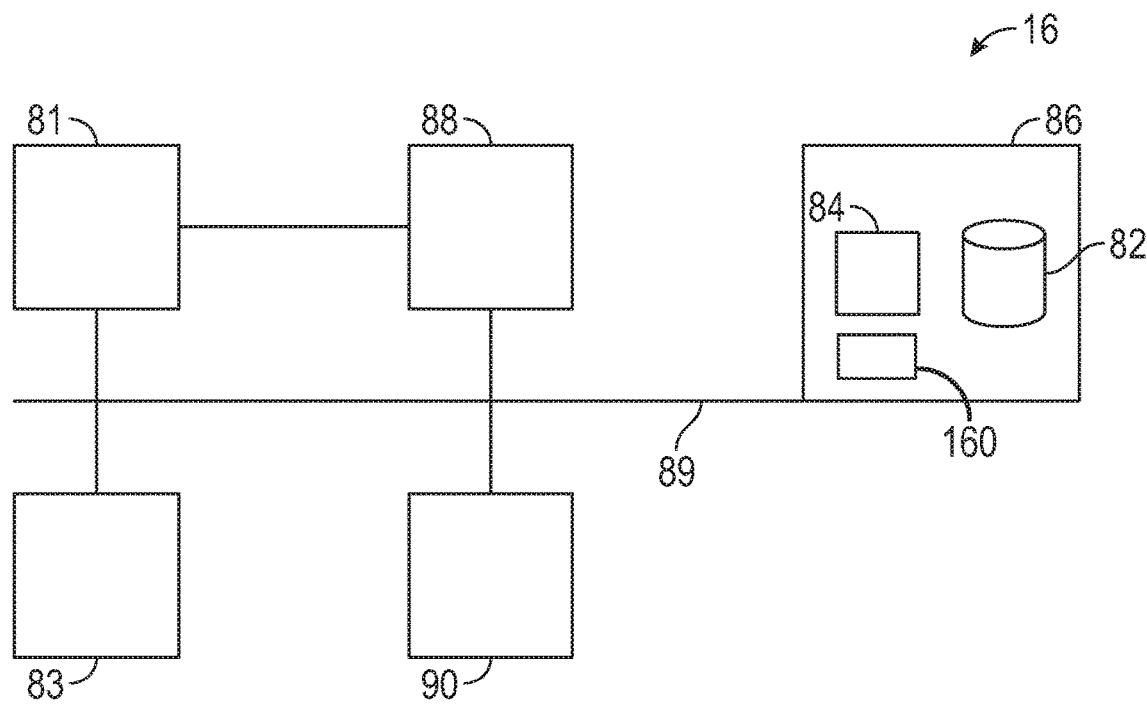
FIG. 3 is a diagrammatic view of an exemplary embodiment of a network administration device for use in the system for automatically computing an NLI value that may be used to compute a launch power for an optical node illustrated in FIG. 1.

Referring now to FIG. 3, shown therein is a diagrammatic view of an exemplary embodiment of the network administration device 16. The network administration device 16 may include one or more devices that gather, process, search, store, and/or provide information in a manner described herein. In the illustrated embodiment, the network administration device 16 is provided with an input device 81 one or more databases 82 (hereinafter "database 82"), program logic 84, and one or more processors 88 (hereinafter "processor 88"). The program logic 84, the database 82, and a machine learning model 160 may be stored on non-transitory computer readable storage memory 86 (hereinafter "memory 86") accessible by the processor 88 of the network administration device 16. It should be noted that as used herein, program logic 84 is another term for instructions which can be executed by the processor 54 or the processor 88. The database 82 can be a relational database or a non-relational database. Examples of such databases comprise, DB2®, Microsoft® Access, Microsoft® SQL Server, Oracle®, mySQL, PostgreSQL, MongoDB, Apache Cassandra, and the like. It should be understood that these examples have been provided for the purposes of illustration only and should not be construed as limiting the presently disclosed inventive concepts. The database 82 can be centralized or distributed across multiple systems.

In some embodiments, the network administration device 16 may comprise one or more processors 88 working together, or independently to, execute processor executable code stored on the memory 86. Additionally, each network administration device 16 may include at least one input device 81 (hereinafter "input device 81") and at least one output device 83 (hereinafter "output device 83"). Each element of the network administration device 16 may be partially or completely network-based or cloud-based, and may or may not be located in a single physical location.

The processor 88 may be implemented as a single processor or multiple processors working together, or independently, to execute the program logic 84 as described herein. It is to be understood, that in certain embodiments using more than one processor 88, the processors 88 may be located remotely from one another, located in the same location, or comprising a unitary multi-core processor. The processors 88 may be capable of reading and/or executing processor executable code and/or capable of creating, manipulating, retrieving, altering, and/or storing data structures into the memory 86.

Exemplary embodiments of the processor 88 may be include, but are not limited to, a digital signal processor (DSP), a central processing unit (CPU), a field programmable gate array (FPGA), a graphics processing unit (GPU), a microprocessor, a multi-core processor, combinations, thereof, and/or the like, for example. The processor 88 may be capable of communicating with the memory 86 via a path 89 (e.g., data bus). The processor 88 may be capable of communicating with the input device 81 and/or the output device 83.

The processor 88 may be further capable of interfacing and/or communicating with the user device 14 and/or the optical node 19 or the optical amplifier 20 via the network 30 using the communication device 90. For example, the processor 88 may be capable of communicating via the network 30 by exchanging signals (e.g., analog, digital, optical, and/or the like) via one or more ports (e.g., physical or virtual ports) using a network protocol to provide a pump model to the optical amplifier 20 as will be described in further detail herein.

The memory 86 may be capable of storing processor executable code such as program logic 84. Additionally, the memory 86 may be implemented as a conventional non-transitory memory, such as for example, random access memory (RAM), CD-ROM, a hard drive, a solid-state drive, a flash drive, a memory card, a DVD-ROM, a disk, an optical drive, combinations thereof, and/or the like, for example.

In some embodiments, the memory 86 may be located in the same physical location as the network administration device 16, and/or one or more memory 86 may be located remotely from the network administration device 16. For example, the memory 86 may be located remotely from the network administration device 16 and communicate with the processor 88 via the network 30. Additionally, when more than one memory 86 is used, a first memory 86 may be located in the same physical location as the processor 88, and additional memory 86 may be located in a location physically remote from the processor 88. Additionally, the memory 86 may be implemented as a "cloud" non-transitory computer readable storage memory (i.e., one or more memory 86 may be partially or completely based on or accessed using the network 30).

The input device 81 of the network administration device 16 may transmit data to the processor 88 and may be similar to the input device 50 of the user device 14. The input device 81 may be located in the same physical location as the processor 88, or located remotely and/or partially or completely network-based. The output device 83 of the network administration device 16 may transmit information from the processor 88 to the user 12, and may be similar to the output device 52 of the user device 14. The output device 83 may be located with the processor 88, or located remotely and/or partially or completely network-based.

The memory 86 may store processor executable code and/or information comprising the database 82, program logic 84, and the machine learning model 160. In some embodiments, the processor executable code 84 may be stored as a data structure, such as the database 82 and/or data table, for example, or in non-data structure format such as in a non-compiled text file.

Optical node 19 may include one or more devices that gather, process, store, and/or provide information in a manner described herein. For example, optical node 19 may include one or more optical data processing and/or traffic transfer devices, such as an optical add-drop multiplexer ("OADM"), a reconfigurable optical add-drop multiplexer ("ROADM"), or a flexibly reconfigurable optical add-drop multiplexer module ("FRM") and/or any type of device capable of processing and/or transferring optical traffic.

In some implementations, optical node 19 may include OADMs and/or ROADMs capable of being configured to add, drop, multiplex, and demultiplex optical signals. Optical node 19 may process and transmit optical signals to other optical nodes 19 throughout optical network 22 in order to deliver optical transmissions.

Figure 4:
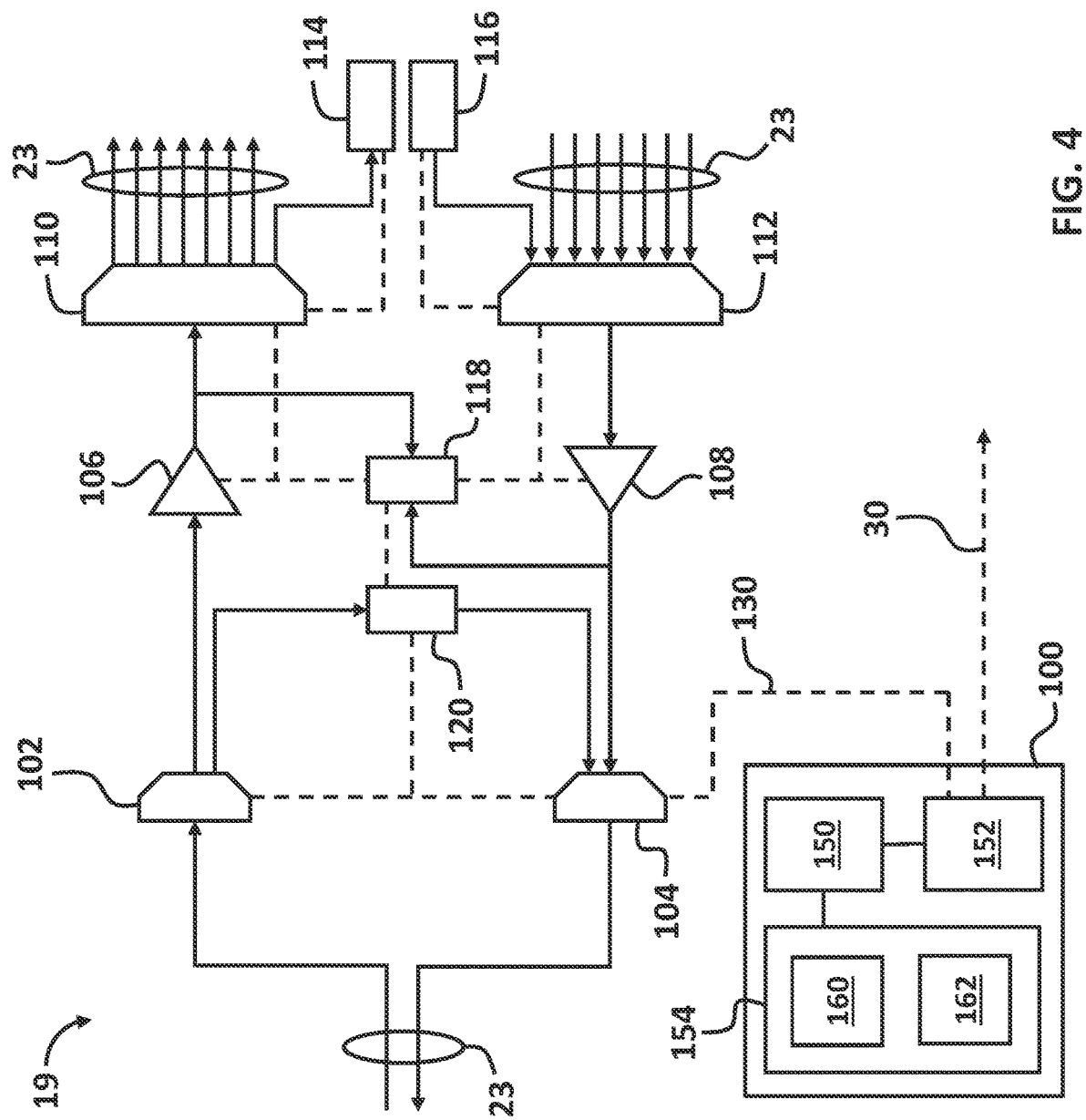
FIG. 4 is a diagrammatic view of an exemplary embodiment of an optical node for use in the system for automatically computing an NLI value that may be used to compute a launch power for an optical node constructed in accordance with one embodiment of the present disclosure.

Referring now to FIG. 4, shown therein is a diagrammatic view of an exemplary optical node 19 of optical network 22 that may be monitored and/or configured according to implementations described herein. In accordance with the present disclosure, the optical node 19 may be a ROADM within the fiber of the optical network 22, that allows dynamic software-driven provisioning of wavelengths in WDM and/or DWDM network services from a remote management system without major network changes or redesign.

The optical node 19 may be provided with a controller 100, an input filter 102, an output filter 104, an input amplifier 106, an output amplifier 108, an output WSS 110, an input WSS 112, at least one add transceiver 114, at least one drop transceiver 116, an optical channel monitor (OCM) 118, and an optical supervisory channel (OSC) 120. It should be noted that the elements of optical node 19 are shown for illustration purposes only and should not be considered limiting. For instance, the illustrated optical node 19 is one possible realization of a single degree of a ROADM. However, the optical node 19 may be implemented as a multi-degree ROADM with a launch power for each optical segment serviced by the optical node 19 implemented in accordance with the inventive concepts described herein. Further, the at least one add transceiver 114 and the at least one drop receiver 116 may be implemented as a line card having multiple add and drop transceivers and may be configured to service channels across multiple ROADM degrees.

The OCM 118 provides the ability to monitor a power level of each wavelength. This information can then be used by the controller 100 to attenuate each wavelength with the output WSS 110 and/or the input WSS 112 at ROADM sites or dynamic gain equalization (DGE) at optical amplifier 20 sites in order to optimize the power level of each wavelength. OCM 118 can also be used to troubleshoot the optical network 22. Recent innovations include flexible-grid OCMs and higher-resolution coherent OCMs. Coherent OCMs offer sub-GHz accuracy and highly accurate power monitoring of fine spectral slices independent of adjacent channel power. They reduce the C-band scanning time from seconds to hundreds of milliseconds. And they provide advanced processing of spectral characteristics, such as valid channel detection, center wavelength, and optical signal-to-noise ratio (OSNR).

The OSC 120 provides a communication channel between adjacent nodes such as optical nodes 19a and 19b that can be used for functions including link control, in-band management, control plane (i.e., ASON/GMPLS), and span loss measurement. Information about the physical properties of the optical network segment 23 (fiber types, loss, amplifier types, etc.) downstream from the optical node 19 that can be communicated to the controller 100 via the OSC 120.

The optical node 19 is illustrated with the controller 100 for controlling the elements of the optical node 19. The optical node 19 may be provided with an interface 130 that connects the controller 100 to the elements of the optical node 19.

The controller 100 may be a microcontroller, for instance, that is provided with a processor 150, a communication device 152, and non-transitory computer readable memory 154 ("memory 154"). The memory 154 may store a machine learning model 160 that may be used to compute NLI that may be used in launch power computation, the launch power configured to launch a signal from the optical node 19 or optical amplifier 20 at a power that maintains a desired optical signal to noise ratio (OSNR) as will be described in further detail herein.

The memory 154 may further store executable code 162 that when executed causes the processor 150 to perform tasks that will be described further herein.

The number of devices illustrated in FIG. 4 are provided for explanatory purposes. In practice, there may be additional devices, fewer devices, different devices, or differently arranged devices than are shown in FIG. 4. Furthermore, two or more of the devices illustrated in FIG. 4 may be implemented within a single device, or a single device illustrated in FIG. 4 may be implemented as multiple, distributed devices. Additionally, one or more of the devices illustrated in FIG. 4 may perform one or more functions described as being performed by another one or more of the devices illustrated in FIG. 4. Devices illustrated in FIG. 4 may interconnect via wired connections (e.g., fiber-optic connections).

Machine Learning (ML) is generally the scientific study of algorithms and statistical models that computer systems use in order to perform a specific task effectively without using explicit instructions, but instead relying on patterns and inference. ML is considered a subset of artificial intelligence (AI). Machine learning algorithms build a mathematical model based on sample data, known as "training data", in order to make predictions or decisions without being explicitly programmed to perform the task. Machine Learning algorithms are commonly in the form of an artificial neural network (ANN), also called a neural network (NN). A neural network "learns" to perform tasks by considering examples, generally without being programmed with any task-specific rules. The examples used to teach a neural network may be in the form of truth pairings comprising a test input object and a truth value that represents the true result from the test input object analysis. When a neural network has multiple layers between the input and the output layers, it may be referred to as a deep neural network (DNN).

Feed-forward Neural Networks are artificial neural networks where node connections do not form a cycle. In other words, information flows only in a forward direction from input nodes, through any layers of hidden nodes, and to output nodes. There is no feedback connection so that the network output is fed back into the network without flowing out. Feed-forward Neural Networks are biologically inspired algorithms that have several neuron-like units arranged in layers. The units in Feedforward Neural Networks are connected and are called nodes. Feedforward Neural Networks process training data by mimicking the interconnectivity of the human brain through the layers of nodes. Each node is made up of inputs, weights, a bias (or threshold), and an output. If the output value of the node exceeds a given threshold, it "fires" or activates the node, passing data to the next layer in the neural network. Connections between nodes differ in strength and/or weight. The weight of the connections provides vital information about the neural network. Neural networks learn a mapping function through supervised learning, adjusting based on a loss function through a process of gradient descent. When the loss function is at or near zero, it is likely that the neural network's model will yield a correct answer.

Figure 5:
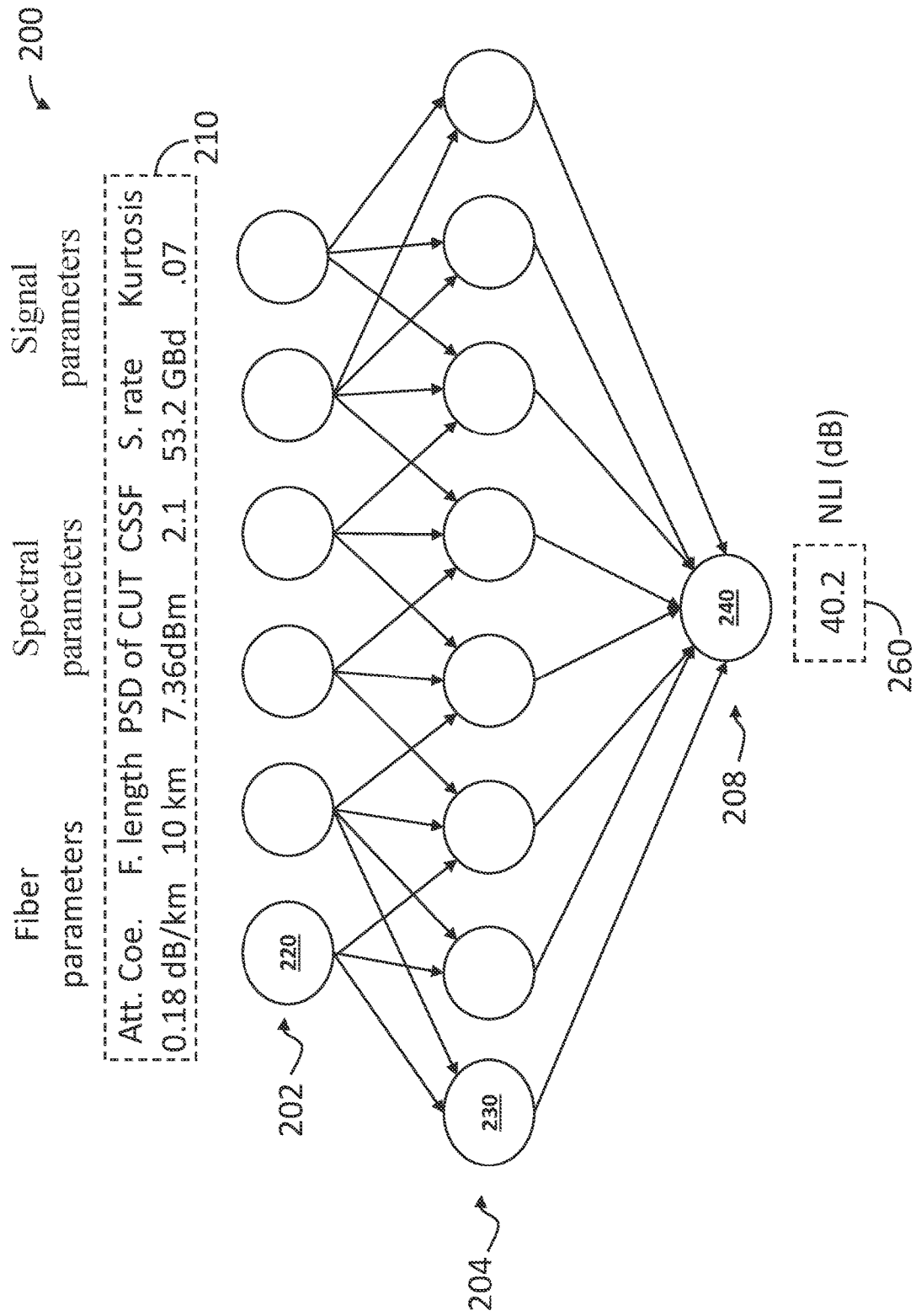
FIG. 5 is a diagram of a feed-forward neural network constructed in accordance with one embodiment of the present disclosure.

Referring now to FIG. 5, shown therein is a diagrammatic representation of an exemplary feed-forward neural network 200 that may be part of the program logic 84 of the network administration device 16. The feed-forward neural network 200 may comprise an input layer 202, a first hidden layer 204, and an output layer 208.

The input layer 202 may be provided with input nodes 220 that receive input and transfer the input to different layers in the feed-forward neural network 200 such as the first hidden layer 204. A number of input nodes 220 in the input layer 202 is the same as a number of features or attributes in a dataset. For instance, in the illustrated feed-forward neural network 200, the input layer 202 has six input nodes 220 (only one of which is numbered in FIG. 6) two of which correspond to fiber parameters of a transmission link such as the optical segment 23, two of which correspond to spectral parameters of the CUT, and two of which correspond to signal parameters of the CUT in a training dataset 210. Exemplary fiber parameters that may be used as input data include attenuation coefficient, dispersion coefficient, dispersion slope, nonlinear index, and fiber length. Spectral parameters that may be used as input data include power spectral density (PSD) of the CUT, PSD of neighboring carriers, carrier spacing scaling factor (CSSF) of the CUT, and CSSF of the neighboring carriers. Signal parameters that may be used as input data include symbol rate of the CUT, excess Kurtosis of the CUT, symbol rate of the neighboring carriers, and excess Kurtosis of the neighboring carriers. It should be noted that while the number of input nodes 220 is illustrated as six, all or a subset of the exemplary fiber parameters, spectral parameters, and signal parameters may be used as input in the feed-forward neural network 200.

The first hidden layer 204 is positioned between the input layer 202 and the output layer 208. The number of hidden layers depends on a type of desired model. The hidden layer 204 each has nodes 230 that impose transformations on the input before transferring the transformed data to a next layer if the transformed data meets certain criteria as will be explained further herein.

It should be noted that the first hidden layer 204 may be provided with any number of nodes operating in parallel with each node 230 receiving input from at least one input node 220 and each node 240 in the output layer 208 receiving input from at least one node 230 in the first hidden layer 204. Increasing the number of nodes 230 in the first hidden layer 204 may increase model accuracy, however, the increase in nodes will also increase the resource consumption (e.g., a time period for the network administration device 16 to train the feed-forward neural network 200 will increase). Therefore, the number of nodes 230 in the first hidden layer 204 of the feed-forward neural network 200 may be designed taking into account factors such as resource constraints and inference and training time.

A strength or magnitude of connection between two nodes is called a weight. For the sake of illustration, weights are represented by arrows such as the arrow connecting input node 220 and node 230, for instance. The value of the weights is usually small and may fall within a range of 0 to 1. The weights are related to each input of each node. For instance, node 230 is illustrated with two inputs. Node 240 of the output layer 208, on the other hand, has eight inputs. The feed-forward neural network 200 studies these weights during a learning phase and can adjust the weights as will be described further herein.

When a node receives data, the node determines a sum of the input data and the weight of the connection. After determining the sum of the input data and the weight, the node initiates an activation function to normalize the sum. The activation function can be either linear or nonlinear. Exemplary activation functions are sigmoid, Tanh, exponential linear unit (ELU), and Rectified Linear Unit (RELU). The sigmoid function maps the input values within the range of 0 to 1. The Tanh function maps the input values between −1 and 1. The RELU function allows only positive values to flow through. The negative values are mapped at 0. ELU, on the other hand, will allow negative values to flow through but usually caps the negative value at −1 meaning it will allow negative values between 0 and −1 but will not activate for a value lower than −1.

In some embodiments, a bias may be applied at each node 230 of the first hidden layer 204. The bias is an external parameter of the node 230 and may be modeled by adding an external fixed value, for instance.

Using a property known as the delta rule, the feed-forward neural network 200 compares outputs of the output nodes 240 with the intended values from the training dataset 210 (such as the illustrated NLI), thus allowing the feed-forward neural network 200 to adjust the weights through training in order to produce a more accurate output value. This process of training and learning produces a form of a gradient descent. In multi-layered neural networks such as feed-forward neural network 200, the process of updating weights is defined more specifically as back-propagation. Through back-propagation, the weights of the first hidden layer 204 within the feed-forward neural network 200 are adjusted by comparing the output value produced by the output layer 208 with the intended values from the training dataset 210 to determine the loss function then adjusting the weights of the first hidden layer 204 until the loss function is at or near zero.

In some embodiments, the feed-forward neural network 200 may use a cost function to determine the changes to make to the weights and/or biases.

The feed-forward neural network 200 uses training datasets such as training dataset 210 that may be a labeled dataset. The training dataset 210 includes labeled data such as the exemplary fiber parameters, spectral parameters, and signal parameters used as inputs and known output such as the NLI value, which allows the feed-forward neural network 200 to learn over time. For example, feed-forward neural network 200 may successively analyze a plurality of training datasets (such as training dataset 210) and adjust weights of connections between nodes (such as nodes 220, 230, and 240) in layers (such as the input layer 202, the first hidden layer 204, and the output layer 208) of the feed-forward neural network 200 to correct outputs (NLI values) until an output (referred to as a corrected training output) is accurate to within a margin of error when compared to the non-linear interference value (known output) associated with the training dataset that was input last. The feed-forward neural network 200 having the corrected training output being a trained neural network.

The feed-forward neural network 200 may measure accuracy using a loss function and/or a mean squared error calculation, adjusting until errors have been sufficiently minimized. Or, in other words, until the output of the feed-forward neural network 200 is within a desired margin of error. This phase of operation of the feed-forward neural network 200 is called a training phase.

In one embodiment, the output NLI may be measured in decibels (dB) and the desired margin of error of the output NLI may be less than one-half decibel (<0.5 dB).

A length of the training phase may depend on a size of the feed-forward neural network 200, a number of training datasets under observation, resource constraints, inference and training time, model format (e.g., number of hidden layers, size of each hidden layer, etc.), platform and language support, and resource consumption, for instance.

Once the feed-forward neural network 200 has been through the training phase, the trained feed-forward neural network 200 may be tested using testing datasets. Testing datasets are similar to training dataset 210, however, they are datasets that the feed-forward neural network 200 was not been exposed to. In other words, the testing datasets have new input data and correlated truth data or output data that can be used to verify if the trained feed-forward neural network 200 produces an output that is within the desired margin of error. For example, the testing datasets may comprise fiber parameters, spectral parameters, signal parameters, and power spectral density values of a testing optical network segment as testing input data and a testing non-linear interference value as testing output data. Testing the trained feed-forward neural network 200 may comprise inputting the testing input data of at least one testing dataset into the trained feed-forward neural network 200 and comparing an output of the trained feed-forward neural network 200 (which may be referred to as a corrected testing output) to the testing output data of the at least one testing dataset.

While the feed-forward neural network 200 is shown and described having only one hidden layer (first hidden layer 204), it should be noted that the feed forward neural network 200 may be implemented having more than one hidden layer with each hidden layer having any number of nodes.

Figure 6:
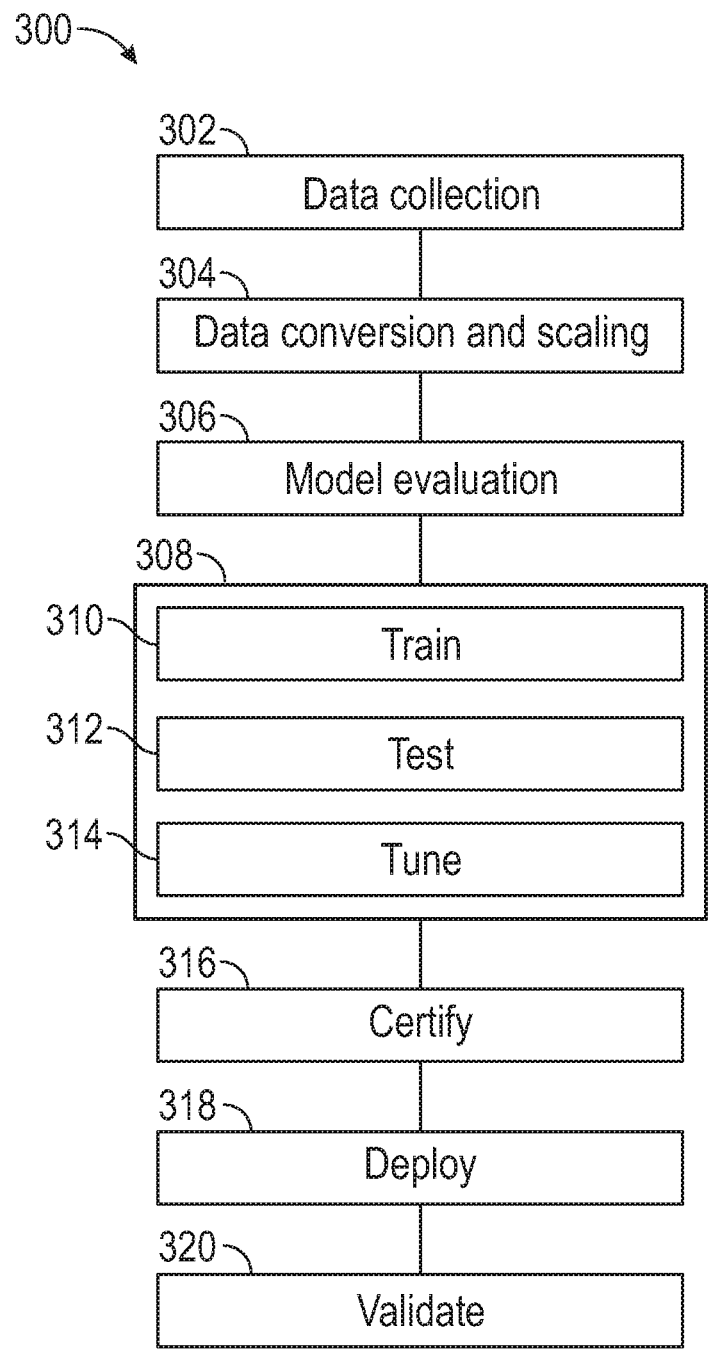
FIG. 6 is a diagram of an example work flow for creating a machine learning model for use in the system for automatically computing an NLI value that may be used to compute a launch power for an optical node in accordance with one embodiment of the present disclosure.

Referring now to FIG. 6, shown therein is an exemplary workflow diagram 300 for creating a machine learning model, such as machine learning model 160, for instance, using the feed-forward neural network 200. In step 302, data may be collected (herein referred to as "collected data") for at least one optical network segment to be used to train and test the machine learning model 160 using the feed-forward neural network 200. For instance, data may be collected from simulations using a gaussian noise (GN) simulator, interpolation, data collected in the field, and lab testing. Exemplary collected data includes amplified spontaneous emission values, fiber parameters, spectral parameters, and signal parameters.

In step 304, collected data may be converted to a format useable by the feed-forward neural network 200. The collected data may further be scaled and/or filtered to remove unwanted data.

In step 306, model types may be evaluated based on factors such as loss, training time, inference time, resource consumption, bias/variance trade-off, and platform and language support, for instance.

In step 308, the machine learning model 160 may be created using the feed-forward neural network 200 by training the machine learning model 160 in step 310 and testing the machine learning model 160 in step 312 as described above. When a new feature is introduced or a feature is changed, the machine learning model 160 may be tuned in step 314 to optimize the machine learning model 160 for the new and/or changed feature. Exemplary features include fiber parameters such as attenuation coefficient, dispersion coefficient, dispersion slope, nonlinear index, and fiber length, spectral parameters such as PSD of the CUT, PSD of neighboring carriers, CSSF of the CUT, and CSSF of the neighboring carriers, and signal parameters such as symbol rate of the CUT, excess Kurtosis of the CUT, symbol rate of the neighbors, and excess Kurtosis of the neighbors. It should be noted, however, that in some instances a new machine learning model may be created rather than tuning the machine learning model 160.

Once the machine learning model 160 is created, an accuracy of the machine learning model 160 may be certified in step 316. Certification of the machine learning model 160 may include inputting known input data that has not been used in the training (step 310) or testing (step 312) of the machine learning model 160 and comparing an output (which may be referred to as a corrected output) of the machine learning model 160 with known output associated with the known inputs. The machine learning model 160 is certified if the output of the machine learning model 160 when compared to the known output is within an error acceptance criterion or margin of error a predetermined percentage of the time. For instance, in one embodiment, the output may be an NLI measured in decibels (dB) and the error acceptance criterion of the NLI may be less than one-half decibel (<0.5 dB). In one embodiment, for the machine learning model 160 to be certified, the output of the machine learning model 160 must meet the error acceptance criterion in over ninety-five percent (95%) of the cases. For instance, during certification, one-hundred (100) known input cases may be fed into the machine learning model 160 and the output in each case may be compared to the known outputs for each case. If the output of the machine learning model 160 meets the error criterion in ninety-five (95) or more of the cases when compared to the known outputs, the machine learning model 160 is certified.

In step 318, the machine learning model 160 is deployed to the controller 100 of the optical node 19. For instance, the machine learning model 160 may be transferred from the network administration device 16 via the network 30 to the optical node 19.

In step 320, the machine learning model 160 deployed on the optical node 19 may be validated by testing an output signal at the optical network segment 23 after a launch power is calculated and applied, for instance, as will be explained further herein.

Figure 7:
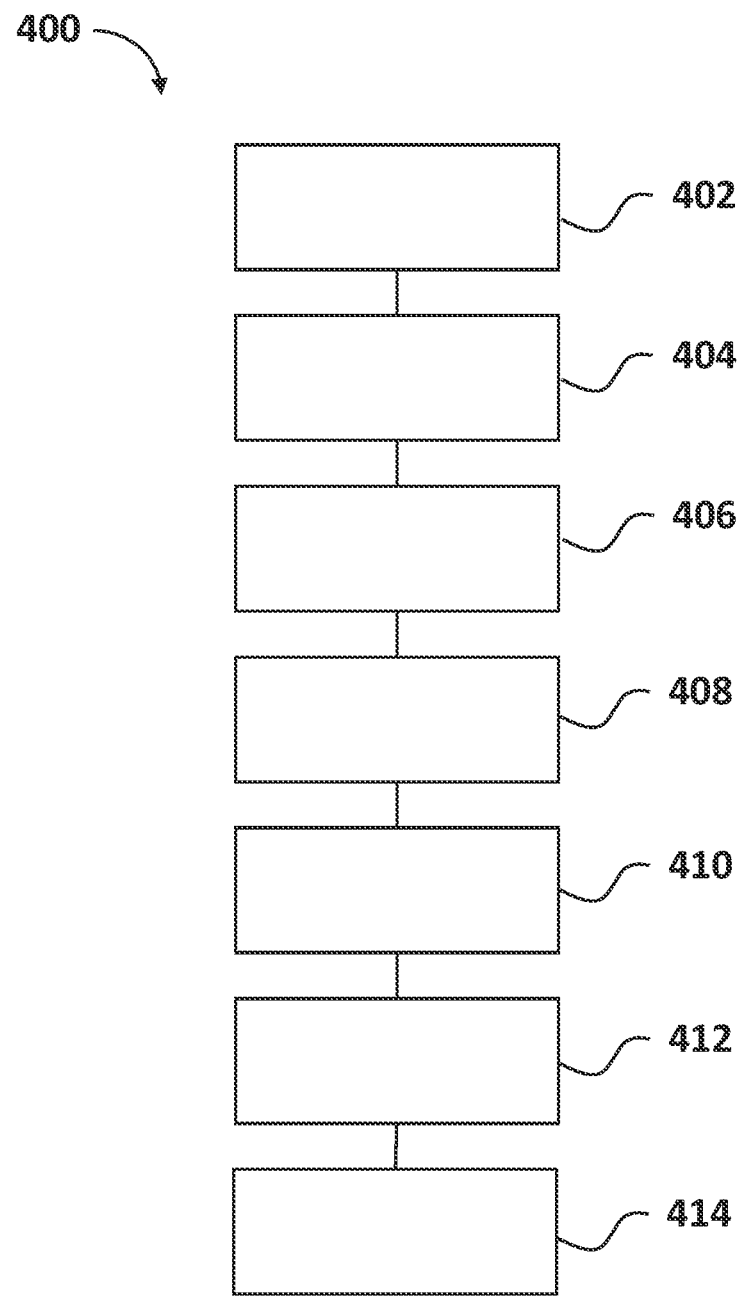
FIG. 7 is a diagram of a process for automatically computing an NLI and using that NLI value to compute a launch power for an optical node in accordance with one embodiment of the present disclosure.

Referring now to FIG. 7, shown therein is an exemplary process diagram illustrating a process 400 of automatically configuring a launch power of the optical node 19. For the sake of illustration, the process 400 will be described using the elements of the system 10 described above. In step 402 data such as ASE values, fiber parameters, spectral parameters, and signal parameters are gathered or collected (which may be referred to herein as "collected data") for an optical network segment such as the optical network segment 23 between optical node 19a and optical node 19b. In one embodiment, the data may be gathered or collected automatically by the controller 100 of the optical node 19 using the OSC 120. In such an embodiment, the executable code 162 may cause the processor 150 to send signals over the OSC 120 configured to gather or collect the data for the optical network segment 23. In such an embodiment, optical node 19a would only calculate the launch power for optical network segment 23 spanning until the next optical node (optical node 19b) which would calculate the launch power of the next optical network segment 23. In another embodiment, the optical network 22 may be part of a software-defined networking architecture (SDN) and the data may be gathered or collected by the network administration device 16 acting as an SDN controller. In such an embodiment, the machine learning model 160 may be deployed on the network administration device 16. In another embodiment, one optical node 19, such as optical node 19a, may be a designated optical node that gathers or collects the data for all optical nodes 19 in the optical network 22. Such an embodiment would require topology discovery of the optical network 22 to be in place. Such topology discovery may be performed using standard topology discovery procedures.

In step 404, the fiber parameters, spectral parameters, and signal parameters collected in step 402 along with power spectral density (PSD) values (which may be referred to as first power spectral density values) are input into the machine learning model 160.

In step 406, the machine learning model 160 computes a NLI value (which may be referred to as a first non-linear interference value).

In step 408, a generalized-optical signal-to-noise ratio (GOSNR) value (which may be referred to as a first generalized-optical signal-to-noise ratio value) is computed using the NLI value computed in step 406 and the ASE values gathered in step 402.

In step 410, a highest GOSNR value is determined by iterating or repeating steps 404-408 with different PSD values used as input variables in step 404. For instance, during the process 400, the machine learning model 160 may repeat or iterate through steps 404-408 using n number of power spectral density values, e.g., the first power spectral density values, second power spectral density values, third power spectral density values, . . . , n power spectral density values as input variables in step 404 which results in n number of generalized-optical signal-to-noise ratio values computed in step 408. For example, after the first generalized-optical signal-to-noise ratio value is computed in step 408, in step 410 second power spectral density values are input in step 404 and used to compute a second non-linear interference value in step 406 after which the second non-linear interference value is used to compute a second generalized-optical signal-to-noise ratio value in step 408, then third power spectral density values are input in step 404 and used to compute a third non-linear interference value in step 406 after which the third non-linear interference value is used to compute a third generalized-optical signal-to-noise ratio value in step 408, and so on until n power spectral density values are input in step 404 and used to compute an n non-linear interference value in step 406 and the n non-linear interference value is used to compute an n generalized-optical signal-to-noise ratio value in step 408. The machine learning model 160 may be programmed to determine the highest GOSNR value by comparing each of the calculated GOSNR values (e.g., the first GOSNR value, the second GOSNR value, the third GOSNR value, and the n GOSNR value).

In step 412, the PSD values used as input to obtain the highest GOSNR are used to calculate the launch power.

In step 414, the launch power is applied to the optical node 19. In an embodiment where the optical node 19a is calculating the launch power for the optical network segment 23 spanning to the next optical node, the executable code 162 may cause the processor 150 to apply the launch power to the optical node 19a. In an embodiment where one optical node 19 acts as the designated optical node, the executable code 162 may cause the processor 150 to send a signal containing launch power information for each optical network segment 23 to the appropriate optical node (e.g., optical node 19b) associated with the optical network segment 23, the signal causing where the launch power to be applied in the appropriate optical node. In an embodiment where the network administration device 16 acts as the SDN controller, the executable code 84 may cause the network administration device 16 to send a signal to each optical node containing launch power information for the optical network segment 23 associated with each optical node, the signal causing the launch power to be applied in the optical node.

From the above description, it is clear that the inventive concept(s) disclosed herein are well adapted to carry out the objects and to attain the advantages mentioned herein, as well as those inherent in the inventive concept(s) disclosed herein. While the embodiments of the inventive concept(s) disclosed herein have been described for purposes of this disclosure, it will be understood that numerous changes may be made and readily suggested to those skilled in the art which are accomplished within the scope and spirit of the inventive concept(s) disclosed herein.

What is claimed is:

1. A method, comprising:
    collecting data for an optical network segment, collected data including fiber parameters, spectral parameters, and signal parameters;
    inputting the collected data for the optical network segment and first power spectral density values in a machine learning model;
    computing, with the machine learning model, a first non-linear interference value of the optical network segment;
    collecting amplified spontaneous emission values for the optical network segment;
    computing a first generalized-optical signal-to-noise ratio value using the computed first non-linear interference value and the amplified spontaneous emission values for the optical network segment;
    iteratively inputting the collected data and at least one second power spectral density values into the machine learning model to compute at least one second non-linear interference value of the optical network segment;

computing at least one second generalized-optical signal-to-noise ratio value using the at least one second non-linear interference value and the amplified spontaneous emission values for the optical network segment;

determining a highest generalized-optical signal-to-noise ratio value for the optical network segment by comparing the first generalized-optical signal-to-noise ratio value and the at least one second generalized-optical signal-to-noise ratio value;

computing a launch power for an optical node of the optical network segment using the power spectral density values associated with the highest generalized-optical signal-to-noise ratio value for the optical network segment; and applying the launch power to the optical node of the optical network segment.

2. The method of claim 1, wherein the machine learning model is generated using machine learning techniques comprising:

training a neural network by inputting a plurality of training datasets into the neural network, each of the plurality of training datasets having fiber parameters, spectral parameters, signal parameters, and power spectral density values of a training optical network segment as inputs and a non-linear interference value as an output, wherein the neural network successively analyzes the plurality of training datasets and adjusts weights of connections between nodes in layers of the neural network to correct outputs until a corrected training output is accurate to within a margin of error when compared to the non-linear interference value associated with the training dataset that was input last, the neural network having the corrected training output being a trained neural network.

3. The method of claim 2, wherein the machine learning model is generated using machine learning techniques further comprising:

testing the trained neural network using at least one testing dataset, the at least one testing dataset comprising fiber parameters, spectral parameters, signal parameters, and power spectral density values of a testing optical network segment as testing input data and a testing non-linear interference value as testing output data, the testing comprising inputting the testing input data of the at least one testing dataset into the trained neural network and comparing a corrected testing output of the trained neural network to the testing output data of the at least one testing dataset.

4. The method of claim 2, wherein the neural network is a feed-forward neural network and wherein the layers of the feed-forward neural network comprise three layers of nodes including an input layer, a first hidden layer, and an output layer, wherein training the feed-forward neural network further comprises assigning a weight to a connection between each of the nodes of the input layer, the first hidden layer, and the output layer.

5. The method of claim 1, wherein the fiber parameters include at least one of an attenuation coefficient, a dispersion coefficient, a dispersion slope, a nonlinear index, and a fiber length.

6. The method of claim 1, wherein the spectral parameters include at least one of a power spectral density of a channel-under-test, a power spectral density of neighboring carriers of the channel-under-test, a carrier spacing scaling factor of the channel-under-test, and a carrier spacing scaling factor of the neighboring carriers.

7. The method of claim 1, wherein the signal parameters that may be used as input data include symbol rate of a channel-under-test, excess Kurtosis of the channel-under-test, symbol rate of neighboring carriers, and excess Kurtosis of the neighboring carriers.

8. The method of claim 2, wherein the corrected training output is the non-linear interference value of the training optical network segment measured in decibels and the margin of error for the non-linear interference value is less than one-half decibel.

9. The method of claim 1, further comprising deploying the machine learning model to a controller of the optical node of the optical network segment, the machine learning model stored in a non-transitory computer readable memory of the controller wherein the steps of the method are performed by the controller.

10. A system, comprising:

an optical network having at least one optical network segment; and an optical node having at least one multiplexer, at least one de-multiplexer, a control channel, and a controller, the controller having a first processor and a first non-transitory computer readable memory storing first instructions and a machine learning model;

wherein the first instructions, when executed by the first processor, cause the controller to:

collect data for the at least one optical network segment, collected data including amplified spontaneous emission values, fiber parameters, spectral parameters, and signal parameters;

input the collected data including fiber parameters, spectral parameters, and signal parameters and first power spectral density values into the machine learning model;

compute a first non-linear interference value of the at least one optical network segment using the machine learning model;

compute a first generalized-optical signal-to-noise ratio value using the computed first non-linear interference value and the amplified spontaneous emission values;

input the collected fiber parameters, spectral parameters, and signal parameters and at least one second power spectral density values into the machine learning model to compute at least one second non-linear interference value of the at least one optical network segment;

compute at least one second generalized-optical signal-to-noise ratio value using the at least one second non-linear interference value and the amplified spontaneous emission values for the at least one optical network segment;

determine a highest generalized-optical signal-to-noise ratio value for the at least one optical network segment by comparing the first generalized-optical signal-to-noise ratio value and the at least one second generalized-optical signal-to-noise ratio value;

compute a launch power for the optical node using the power spectral density values associated with the highest generalized-optical signal-to-noise ratio value for the at least one optical network segment; and apply the launch power to the optical node.

11. The system of claim 10, further comprising a network administration device having a second processor and a second non-transitory computer readable memory storing second instructions that when executed cause the second processor to generate the machine learning model using machine learning techniques and deploy the machine learning model to the controller of the optical node, wherein generating the machine learning model using machine learning techniques comprises:

training a neural network by inputting a plurality of training datasets into the neural network, each of the plurality of training datasets having fiber parameters, spectral parameters, signal parameters, and power spectral density values of a training optical network segment as inputs and a non-linear interference value as an output, wherein the neural network successively analyzes the plurality of training datasets and adjusts weights of connections between nodes in layers of the neural network to correct outputs until a corrected training output is accurate to within a margin of error when compared to the non-linear interference value associated with the training dataset that was input last, the neural network having the corrected training output being a trained neural network.

12. The system of claim 11, wherein generating the machine learning model using machine learning techniques further comprises:

testing the trained neural network using at least one testing dataset, the at least one testing dataset comprising fiber parameters, spectral parameters, signal parameters, and power spectral density values of a testing optical network segment as testing input data and a testing non-linear interference value as testing output data, the testing comprising inputting the testing input data of the at least one testing dataset into the trained neural network and comparing a corrected testing output of the trained neural network to the testing output data of the at least one testing dataset.

13. The system of claim 12, wherein the neural network is a feed-forward neural network, and wherein the layers of the feed-forward neural network comprise three layers of nodes including an input layer, a first hidden layer, and an output layer, wherein training the feed-forward neural network further comprises assigning a weight to a connection between each of the nodes of the input layer, the first hidden layer, and the output layer.

14. The system of claim 11, wherein the fiber parameters include at least one of an attenuation coefficient, a dispersion coefficient, a dispersion slope, a nonlinear index, and a fiber length.

15. The system of claim 11, wherein the spectral parameters include at least one of a power spectral density of a channel-under-test, a power spectral density of neighboring carriers of the channel-under-test, a carrier spacing scaling factor of the channel-under-test, and a carrier spacing scaling factor of the neighboring carriers.

16. The system of claim 11, wherein the signal parameters that may be used as input data include symbol rate of a channel-under-test, excess Kurtosis of the channel-under-test, symbol rate of neighboring carriers, and excess Kurtosis of the neighboring carriers.

17. The system of claim 11, wherein the corrected training output is the non-linear interference value of the training optical network segment measured in decibels and the margin of error for the non-linear interference value is less than one-half decibel.

* * * * *